C. J. HUG.
TURNTABLE.
APPLICATION FILED JUNE 26, 1920.

1,367,602.

Patented Feb. 8, 1921.

INVENTOR
Christian J. Hug,
BY
James L. Hopkins,
ATTORNEY

UNITED STATES PATENT OFFICE.

CHRISTIAN J. HUG, OF HIGHLAND, ILLINOIS.

TURNTABLE.

1,367,602.  Specification of Letters Patent.  Patented Feb. 8, 1921.

Application filed June 26, 1920. Serial No. 392,034.

*To all whom it may concern:*

Be it known that I, CHRISTIAN J. HUG, a citizen of the United States, residing at Highland, in the county of Madison and State of Illinois, have invented certain new and useful Improvements in Turntables, of which the following is a specification, reference being had therein to the accompanying drawing.

My invention relates to a portable turntable for self-propelled motor vehicles and has for its object to provide a pivotally mounted frame whereon said vehicle is driven and held with one of its driving wheels in contact with the surface on which the turntable is operatively supported; the rotation of the turntable being effected by the contact of said driving wheel with said surface.

In the drawings—

Figure 1 is a top plan view of a structure embodying my invention.

Fig. 2 is a side elevation of the same.

Fig. 3 is an enlarged plan view of the pivot bearing.

Fig. 4 is a transverse sectional view of the same taken on the line A—A of Fig. 3.

Fig. 5 is a plan view of the turntable front wheel mounting.

Fig. 6 is a sectional view of the axle and its hinge taken on the line B—B of Fig. 5.

Fig. 7 is a side elevation of the rear portion of one of the tracks comprising the turntable.

Fig. 8 is a side elevation of the hook 19 employed to lock the front-wheel axles in position.

In the drawings a chassis is indicated in dotted lines, its frame 20 being supported by the driven wheels 21 and 22 and the driving wheels 23 and 24. The vehicle so indicated is driven by its own power upon the turntable of my invention, as shown in Fig. 1, so that the wheels 21 and 23 rest upon the track 5, wheel 22 rests upon the shorter track 7, and the wheel 24 rests upon the ground or surface whereon the turntable rests.

The tracks 5 and 7 are joined by the cross-bar 25 and the brace 26. The front end of the track 5 has the wheel 27 mounted on the axle 28, which is hinged at 29, the axle 28 having a lever 30 which is secured to said axle 28 at 31 (see Fig. 6) and serves to lock the axle 28 in a position alined with the track 5 or in transverse position, (see Fig. 5) in which latter position the wheel 27 is used moving the entire turntable structure forward or backward. In this position the hook 19 is employed to lock the lever 30 in location as shown in Fig. 5.

Each of the tracks 5 and 7 has a bumper 32 at its front end to limit the forward movement of the vehicle being carried by the turntable. Each of said tracks 5 and 7 has at its rear end a guide-plate 10, hinged at the point 18; a spring 13 connecting the arms 33 and 34 serves to keep the guide-plate 10 normally out of contact with the surface 35 on which the turntable rests (see Fig. 7), the plate 10 being depressed by contact with the advancing wheel of the motor vehicle to serve as a skid therefor.

The turntable pivots about the bearing carried by the plate 16. A frame 4 incloses the bolt 17 and carries the track 5 by means of the bracket 14 and bolts 15—15; the bracket 14 having beneath it the caster 6, resting on the plate 16 (see Fig. 4).

The motor vehicle being driven into the position shown in Figs. 1 and 2, and wheels 27 and 36 being in the positions shown in Fig. 1, the continued driving of the vehicle wheel 24 (the vehicle being held against forward movement on the turntable by the bumpers 32) will cause the turntable to revolve about the pivot bolt 17.

The plate 16 is curved upwardly at its rear edge as indicated by 37, and has cut in said edge an eye 38 in which means may be inserted to drag the turntable to a new position.

Having described my invention what I claim is—

1. A turntable for self-propelled motor vehicles comprising a pair of parallel tracks to receive said vehicle, one track receiving both a front wheel and a rear wheel, the other and shorter track receiving a front wheel only; a frame carrying said tracks; and a pivot-bearing whereon said frame is rotatably mounted.

2. A turntable for self-propelled motor vehicles comprising a pair of parallel tracks to receive said vehicle, one track receiving both a front wheel and a rear wheel, the other and shorter track receiving a front wheel only; each of said tracks having a guide-plate hingedly mounted at its rear end, and yieldable means whereby said plate is normally held out of contact with the surface whereon said turntable rests; a frame carrying said tracks; and a pivot-bearing whereon said frame is rotatably mounted.

3. A turntable of the class described comprising a track to hold the front and rear wheels of one side of a motor vehicle; a shorter track to hold the driven wheel of the opposite side of said vehicle leaving the driving wheel of that side in contact with the surface whereon said turntable is operatively supported; and a pivoted frame carrying said tracks.

4. A turntable of the class described comprising a track to hold the front and rear wheels of one side of a motor vehicle; a shorter track to hold the driven wheel of the opposite side of said vehicle leaving the driving wheel of that side in contact with the surface whereon said turntable is operatively supported; a bumper at the forward end of each of said tracks; and a pivoted frame carrying said tracks.

5. A turntable of the class described comprising a track to hold the front and rear wheels of one side of a motor vehicle; a shorter track to hold the driven wheel of the opposite side of said vehicle leaving the driving wheel of that side in contact with the surface whereon said turntable is operatively supported; a pivoted frame carrying said tracks; and wheels supporting the front ends of said tracks.

6. A turntable of the class described comprising a frame whereon a self-propelled motor vehicle is received and held with one driving wheel free from the frame and in contact with the surface whereon the turntable is supported; a pivot-bearing beneath said frame and located toward one end thereof; and a wheel supporting the other end of said frame.

7. A turntable of the class described comprising a frame whereon a self-propelled motor vehicle is received and held with one driving wheel free from the frame and in contact with the surface whereon the turntable is supported; a pivot-bearing beneath said frame and located toward one end thereof; a pair of wheels at the opposite end of said frame, and having hinged axles, and means for locking said axles in forward or lateral position.

In testimony whereof I hereunto affix my signature.

CHRISTIAN J. HUG.